(12) United States Patent
Ames

(10) Patent No.: US 7,302,139 B1
(45) Date of Patent: Nov. 27, 2007

(54) THERMALLY COMPENSATED FIBER BRAGG GRATING MOUNT

(75) Inventor: Gregory H. Ames, South Kingstown, RI (US)

(73) Assignee: The United States of America represented by the Secretary of the Navy., Washington, DC (US)

( * ) Notice: Subject to any disclaimer, the term of this patent is extended or adjusted under 35 U.S.C. 154(b) by 0 days.

(21) Appl. No.: 11/700,968

(22) Filed: Jan. 25, 2007

(51) Int. Cl.
*G02B 6/34* (2006.01)
*G02B 6/00* (2006.01)
(52) U.S. Cl. .......................................... 385/37; 385/12
(58) Field of Classification Search ............ 385/12–13, 385/37
See application file for complete search history.

(56) References Cited

U.S. PATENT DOCUMENTS 7,133,582 B1 * 11/2006 Moslehi et al. ............... 385/13

* cited by examiner

*Primary Examiner*—Frank G. Font
*Assistant Examiner*—Michael P. Mooney
(74) *Attorney, Agent, or Firm*—James M. Kasischke; Michael P. Stanley; Jean-Paul A. Nasser

(57) ABSTRACT

A thermally compensated fiber Bragg grating package is used with a fiber optic sensor. The package includes a Bragg grating mount connected at each end of a sensor mandrel. An optical fiber is wound around the sensor mandrel and a fiber portion having a Bragg grating therein is wound onto the mount. The mount is made of a rigid material having a negative coefficient of thermal expansion to minimize thermally induced spectral shifts. One example of the material includes zirconium tungstate. A coating material can be used to further adhere the optical fiber to the sensor mandrel and/or to the mount. The mount preferably includes a ramped groove to provide for a smooth transition from the sensor mandrel to the mount.

18 Claims, 2 Drawing Sheets

THERMALLY COMPENSATED FIBER BRAGG GRATING MOUNT

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to fiber optic sensor arrays and, more particularly, to a thermal compensated fiber Bragg grating package for use in a fiber optic sensor array.

(2) Description of the Prior Art

The use of fiber optic sensors to determine the presence or magnitude of an external parameter is generally known in the art. A fiber optic hydrophone typically includes a hollow compliant mandrel with an optical fiber wound on the mandrel surface to sense pressure generated by acoustic pressures under water. One type of wavelength and time division multiplexed (WDM/TDM) fiber optic hydrophone array is based upon fiber Bragg gratings (FBGs). FBGs are periodic refractive index variations infixed into the core of the optical fiber by an ultraviolet laser. In the sensor array, the gratings serve as reflectors implementing the interferometric sensor. A typical array includes a plurality of FBGs separated by lengths of sensor fiber wound on the compliant sensor mandrels.

The FBGs reflect over a very narrow wavelength band, and it is desirable to minimize the shift of this band with external factors such as pressure and temperature. When such spectral shifts are minimized, multiple wavelength channels can be placed closer in wavelength, allowing the system to have more sensor channels at different wavelengths. Normally, the FBG1s thermal sensitivity is dominated by the thermo-optic effect on the fibers index of refraction. If, however, the FBGs were merely wound with the rest of the fiber on the compliant plastic mandrels of the hydrophone, the large thermal expansion coefficient of the plastic would dominate and lead to excessive thermal shift of the gratings. Additionally, the sensor mandrels are specifically designed to be sensitive to pressure, and the depth changes of a towed hydrophone array would also cause significant changes in the FBGs if wound directly on the mandrel.

Research has been performed on temperature insensitive packages for FBGs, for example, as described in the article entitled, "Temperature Compensation Technique for Fiber Bragg Gratings Using Liquid Crystalline Polymer Tubes," T. Iwashima et al., Electronic Letters, Volume 33, No. 5, 27 Feb. 1997, pp. 417-418, incorporated herein by reference. The package described in this article makes use of a material with a negative coefficient of thermal expansion to offset the main thermo-optic effect in the grating. The optical fiber with the grating is fixed inside a linear structure comprised of a tube made of the negative expansion material.

One problem with this type of FBG package and other types of FBG packages is that they are unsuitable for automated hydrophone array fabrication because they are linear structures. This type of linear or straight FBG package cannot be wound around a thin, cylindrical towed array mandrel. In order to use this type of linear FBG package, the winding of an array must be interrupted, the FBG must be placed into the linear package, and the package must be positioned by hand along the axis of the array. The machine winding of the next array portion can then commence. Since the existing linear FBG packages must be placed longitudinally, the length of the sensor is increased to accommodate the length of the linear structure.

This type of FBG package also cannot be packaged ahead of time because the straight packages cannot go through the pulleys on a winding machine. When a grating is to be placed, the completed winding must be tacked down with epoxy so that it does not spring loose when fiber is pulled off the winder by hand to package and lay the FBG. Thus, the existing linear FBG packages cannot be used in an automated array assembly.

SUMMARY OF THE INVENTION

One object of this invention is to provide a protective and temperature compensating package for FBGs used in wavelength and time division multiplexed fiber optic sensor arrays.

Another object of the present invention is a FBG package that can be used in the automated construction or assembly of sensor arrays where multiple sensors are wound in a continuous manner without the FBG package unduly complicating or interrupting this fabrication process.

The present invention features a fiber optic sensor comprising a sensor mandrel and a Bragg grating mount coupled to one end of the sensor mandrel. The sensor mandrel is made of a compliant material. The Bragg grating mount is made of a material having a negative coefficient of thermal expansion and is substantially rigid such that the Bragg grating mount is less compliant than the sensor mandrel. An optical fiber is wound around the sensor mandrel. The optical fiber includes a FBG portion having a FBG at one end, which is wound onto the Bragg grating mount. The fiber optic sensor can also include a coating of material over the FBG portion of the optical fiber to secure the optical fiber to the outer surface of the Bragg grating mount.

The optical fiber is preferably a single, continuous fiber wound onto the Bragg grating mount and off of the Bragg grating mount. In one embodiment, an interlink is connected to the Bragg grating mount for connecting to another sensor. The optical fiber after the FBG portion is wound over the interlink. The interlink includes an outer structure having a hollow interior and an open cell foam within the hollow interior.

The present invention also features a fiber Bragg grating (FBG) package comprising a Bragg grating mount made of a material having a negative coefficient of thermal expansion and having a generally cylindrical outer surface. In one example, the material is a negative expansion ceramic, such as zirconium tungstate. The negative coefficient of thermal expansion is preferably about $-9 \times 10^{-6} \, °C.^{-1}$. An optic fiber including a FBG is wound onto the Bragg grating mount. The Bragg grating mount preferably includes a ramped groove extending from a central region to an outer surface of the Bragg grating mount such that the optical fiber is wound onto the ramped groove to the outer surface.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
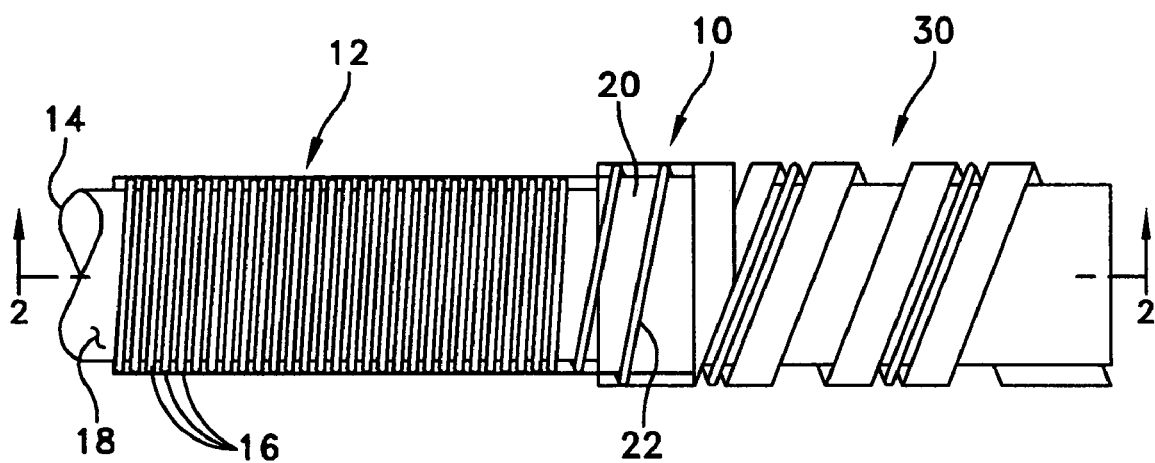
FIG. 1 is a side view of the fiber optic sensor having a thermal compensated FBG package, according to one embodiment of the present invention.

A thermal compensated fiber Bragg grating (FBG) package 10, FIG. 1, is used with a fiber optic sensor 12, for example, in an underwater hydrophone array. In the exemplary embodiment, the fiber optic sensor 12 includes a generally cylindrical sensor mandrel 14 and an optical fiber 16 wound around an outer surface 18 of the sensor mandrel 14. The sensor mandrel 14 is preferably hollow and made of a compliant material such as plastic designed to be sensitive to pressure changes. Thermally compensated FBG package 10 can also be used with other types of fiber optic sensors.

The thermally compensated FBG package 10 includes a Bragg grating mount 20 coupled to one end of the sensor mandrel 14. The optical fiber 16 includes a fiber Bragg grating (FBG) portion 22 at one end, which includes the FBG. The FBG acts as a reflector to define the end of the sensor 12 and possibly the beginning of the next sensor. The FBG portion 22 of the optical fiber 16 is preferably wound under tension on the Bragg grating mount 20. In one embodiment, a coating of material 24, such as epoxy or cement (e.g., ultraviolet cured cement), is used to further attach the optical fiber 16 to the sensor mandrel 14 and the FBG portion 22 to the Bragg grating mount 20.

The Bragg grating mount 20 is made of a material having a negative coefficient of thermal expansion to compensate for temperature, as described in greater detail below. The material of the Bragg grating mount 20 is also substantially rigid such that the Bragg grating mount 20 is less compliant than the sensor mandrel 14. This essentially eliminates any variation of the FBG due to pressure changes associated with depth changes.

According to one preferred embodiment, the Bragg grating mount 20 is made of zirconium tungstate having an isotropic negative coefficient of thermal expansion of $-9 \times 10^{-6}$ °C.$^{-1}$. Other known materials having this property include members of the $AM_2O_8$ family of materials (where A=Zr or Hf, M=Mo or W) and $ZrV_2O_7$. Collectively these materials are known as negative coefficient of thermal expansion ceramics.

The wavelength shift of a Bragg grating is given by the following formula:

$$\frac{\Delta \lambda}{\lambda} = (\alpha + \delta)\Delta T \quad (1)$$

where $\lambda$ is the design wavelength, $\alpha$ is the coefficient of thermal expansion of the fiber itself, and $\delta$ is the thermo-optic coefficient giving the change in refractive index with temperature. Normally $\alpha$ is $0.55 \times 10^{-6}$ °C.$^{-1}$ and $\delta$ is $8.31 \times 10^{-6}$ °C.$^{-1}$. Using these coefficients, the thermo-optic effect dominates. When the FBG portion 22 is wound under tension on the Bragg grating mount 20, the negative coefficient of thermal expansion of the material (e.g., zirconium tungstate) of the Bragg grating mount 20 is used instead of the coefficient of thermal expansion $\alpha$ of the fiber itself. In other words, the fiber 16 is stretched or contracted with the expansion or contraction of the Bragg grating mount. The total shift in wavelength is reduced by an order of magnitude because the negative coefficient a will offset the positive thermo-optic coefficient $\delta$. Using a material having negative coefficient of thermal expansion, therefore, substantially reduces the change in Bragg grating reflection wavelength.

The Bragg grating mount 20 can also be made of other ceramic materials or a mixture of ceramic materials having a negative coefficient of thermal expansion that compensates the thermo-optic coefficient of the optical fiber 16. The negative coefficient of thermal expansion should be determined based on measured values of the particular fiber's thermo-optic coefficient and the requirements for minimizing thermally induced spectral shifts of the fiber Bragg gratings. For instance, a suitable glass ceramic material known as NEX™ is sold by Ohara Corporation of Somerville, N.J. (50 Columbia Road, Branchburg Township, Somerville, N.J. 08876-3519.) The required negative coefficient of thermal expansion can be determined based on measured values of the thermo-optic coefficient of the particular fiber, and the requirements for how completely thermally induced spectral shifts of the grating need to be minimized. Any material with a expansion coefficient close enough to meet these requirements is acceptable. In addition, the Bragg grating mount 20 can also be made of a mixture of materials that give the correct composite expansion coefficient. For example, titanium tungstate may have a coefficient which is too negative, but when mixed with other ceramic materials, can give a coefficient within the desired range that more closely compensates the thermo-optic coefficient of the fiber.

Figure 3:
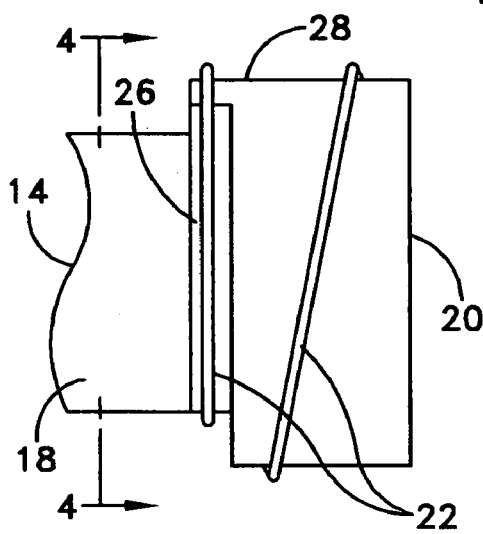
FIG. 3 is a side view of the Bragg grating mount connected to a sensor mandrel, according to one embodiment of the present invention.
Figure 4:
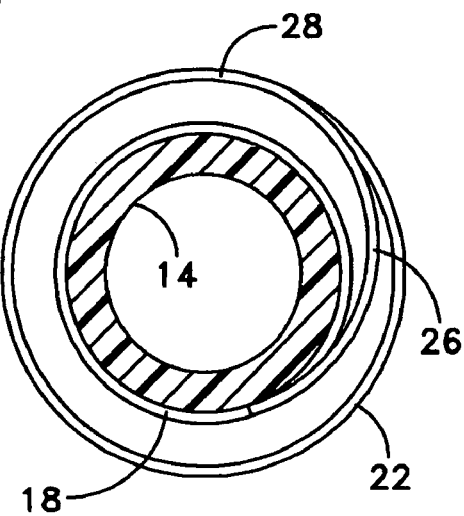
FIG. 4 is a cross-sectional view of the sensor mandrel and Bragg grating mount taken along line 4-4 in FIG. 3.

One embodiment of the Bragg grating mount 20, FIGS. 3 and 4, includes a ramped groove 26 proceeding from the surface 18 of the mandrel 14 to an outer surface 28 of the Bragg grating mount 20. The Bragg grating mount 20 can have another groove (not shown) at the opposite side to allow the optical fiber to wind off of the Bragg grating mount. The ramped groove 26 provides a smooth transition when winding the fiber onto and off of the Bragg grating mount 20, thereby reducing high stress points in the fiber.

Figure 2:
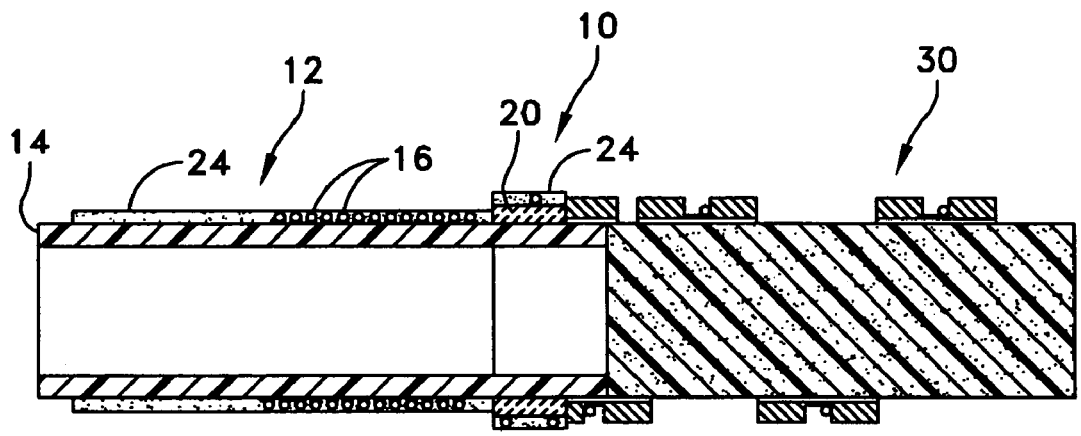
FIG. 2 is a cross-sectional view of the fiber optic sensor taken along line 2-2 in FIG. 1.
Figure 5:
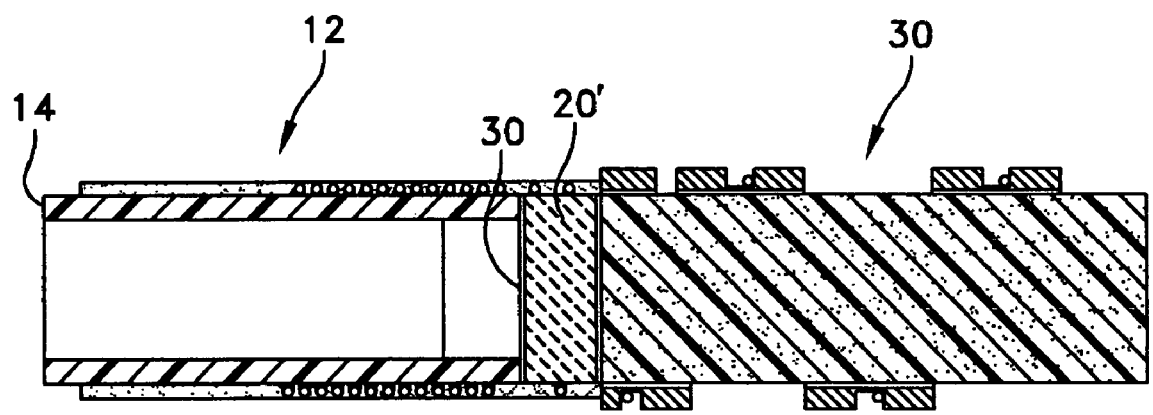
FIG. 5 is a cross-sectional view of a fiber optic sensor having a thermal compensated FBG package, according to another embodiment of the present invention.
Figure 6:
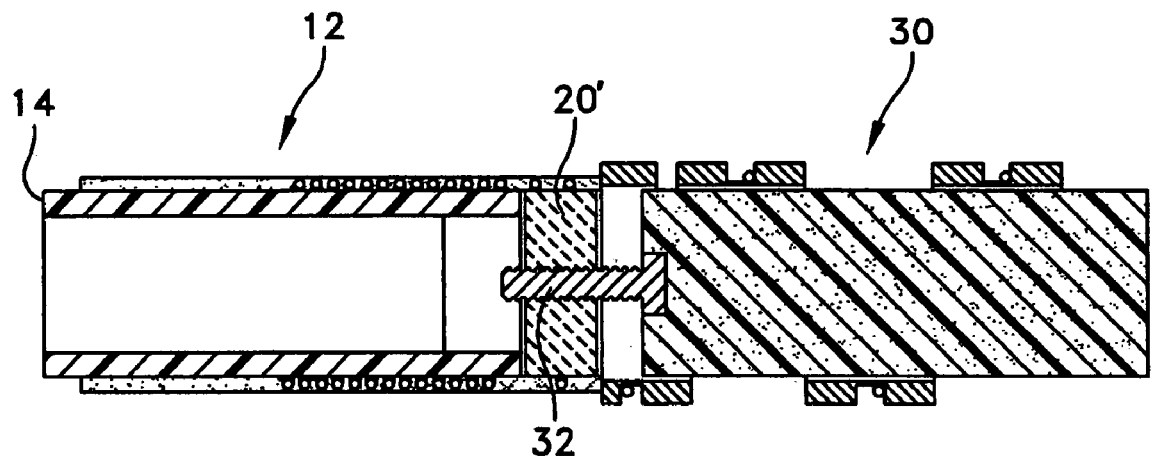
FIG. 6 is a cross-sectional view of a fiber optic sensor having a thermal compensated FBG package, according to a further embodiment of the present invention.

In one embodiment, the Bragg grating mount 20 is a cylindrical shell (FIGS. 2-4) that is attached over the end of the sensor mandrel 14. According to another embodiment, the Bragg grating mount 20', FIGS. 5 and 6, is a cylindrical disc attached to an end of the sensor mandrel 14, for example, using epoxy 30 (FIG. 5) or using a screw or other fastener 32 (FIG. 6). In these embodiments, the outside diameter of the Bragg grating mount 20' is substantially the same as the outside diameter of the sensor mandrel 14 and thus, a ramped groove is not necessary. The Bragg grating mount 20, 20' can be attached to the sensor mandrel 14 using any other attachment method.

According to one embodiment, an interlink 30 connects the fiber optic sensor 12 and FBG package 10 to other adjacent in a sensor array. Interlink 30 is used for linking hydrophone elements while allowing stretching and compression while handling. Example of the interlink 30 are described in greater detail in U.S. Pat. No. 6,118,733, entitled "Interlink for Spatially Extended Hydrophones," and U.S. Pat. No. 6,111,820, entitled "Semi-Rigid Low-Noise Interlink for Spatially Extended Hydrophones". These patents incorporated herein by reference. The fiber 16 is wound continuously from the sensor mandrel 14 onto the Bragg grating mount 20, and continues onto the interlink 30. According to the exemplary embodiment, the interlink 30 includes a helical outer structure 32 and an open cell foam 34 within a hollow interior of the outer structure 32. Although one particular interlink is shown in the exemplary embodiment, the Bragg grating package 10 of the present invention can be modified for use with various designs of interlinks. Alternatively, the optical fiber can be wound back to a mandrel surface instead of the interlink 30.

In use, the sensor 10 and FBG package 10 can be assembled using an automated process such as the existing manufacturing process for hydrophone arrays using a fiber winding machine. The optical fiber 16 including the FBG portions 22 for multiple sensors is loaded onto a winding reel once. The winding machine loads the optical fiber 16 including the FBG portions 22 onto the sensor mandrel 14 and Bragg grating mount 20 under the proper tension automatically. The optical fiber 16 is wound continuously around the sensor mandrel 14, onto the Bragg grating mount 20 and off of the Bragg grating mount 20 as a single fiber with minimal interruption by the FBG package 10. The optical fiber 16 can then be wound continuously onto another sensor mandrel 14 or onto an interlink 30 to assemble an array of multiple sensors.

This automated winding of hydrophone arrays reduces assembly costs. The FBG package 10 of the present invention also adds very little length to the sensor 12, thereby reducing the susceptibility of the sensor 12 and FBG package 10 to bending, which would induce optical phase noise in the interferometric sensor. The Bragg grating package 10 of the present invention also adds very little mass to the sensor 12, thereby reducing the susceptibility of the sensor to transverse acceleration.

In light of the above, it is therefore understood that within the scope of the appended claims, the invention may be practiced otherwise than as specifically described.

What is claimed is:

1. A fiber optic sensor comprising:
    a sensor mandrel made of a compliant material having two ends;
    at least two Bragg grating mounts coupled to each end of said sensor mandrel, said Bragg grating mounts being made of a material having a negative coefficient of thermal expansion and being substantially rigid such that said Bragg grating mount is less compliant than said sensor mandrel; and
    an optical fiber having a sensing length wound around said sensor mandrel and fiber Bragg grating lengths having a Bragg gratings formed therein and wound onto each said Bragg grating mount.

2. The fiber optic sensor of claim 1 further comprising an interlink connected to one said Bragg grating mount, for connecting to another fiber optic sensor, and wherein said optical fiber is wound over said interlink.

3. The fiber optic sensor of claim 2 wherein said interlink includes an outer structure having a hollow interior and an open cell foam within said hollow interior.

4. The fiber optic sensor of claim 1 further including a coating of material over said fiber Bragg grating portion of said optical fiber to secure said optical fiber to an outer surface of said Bragg grating mount.

5. The fiber optic sensor of claim 1 wherein said Bragg grating mount includes a ramped groove extending from an outer surface of said sensor mandrel to an outer surface of said Bragg grating mount, and wherein said optical fiber is wound onto said ramped groove.

6. The fiber optic sensor of claim 1 wherein each said Bragg grating mount is a cylindrical shell attached over an end of said sensor mandrel.

7. The fiber optic sensor of claim 1 wherein each said Bragg grating mount is a cylindrical disc attached to an end of said sensor mandrel.

8. The fiber optic sensor of claim 1 wherein each said Bragg grating mount material is a negative expansion ceramic.

9. The fiber optic sensor of claim 1 wherein each said Bragg grating mount material includes zirconium tungstate.

10. The fiber optic sensor of claim 1 wherein said negative coefficient of thermal expansion is about $-9 \times 10^{-6}$ $C.^{-1}$.

11. The fiber optic sensor of claim 1 wherein said sensor mandrel is made of a plastic material.

12. A fiber Bragg grating package comprising:
    a Bragg grating mount made of a material having a negative coefficient of thermal expansion and having a generally cylindrical outer surface; and
    an optical fiber including a fiber Bragg grating wound onto said Bragg grating mount.

13. The fiber Bragg grating package of claim 12 wherein said Bragg grating mount includes a ramped groove extending to an outer surface of said Bragg grating mount, and wherein said optical fiber is wound onto said ramped groove.

14. The fiber Bragg grating package of claim 12 wherein said material is a negative expansion ceramic.

15. The fiber Bragg grating package of claim 12 wherein said material includes zirconium tungstate.

16. The fiber Bragg grating package of claim 12 wherein said negative coefficient of thermal expansion is about $-9 \times 10^{-6}$ $C.^{-1}$.

17. The fiber Bragg grating package of claim 12 further including a coating of material over said optical fiber including said fiber Bragg grating.

18. The fiber Bragg grating package of claim 17 wherein said coating of material includes one of epoxy and cement.

* * * * *